Patented July 9, 1935

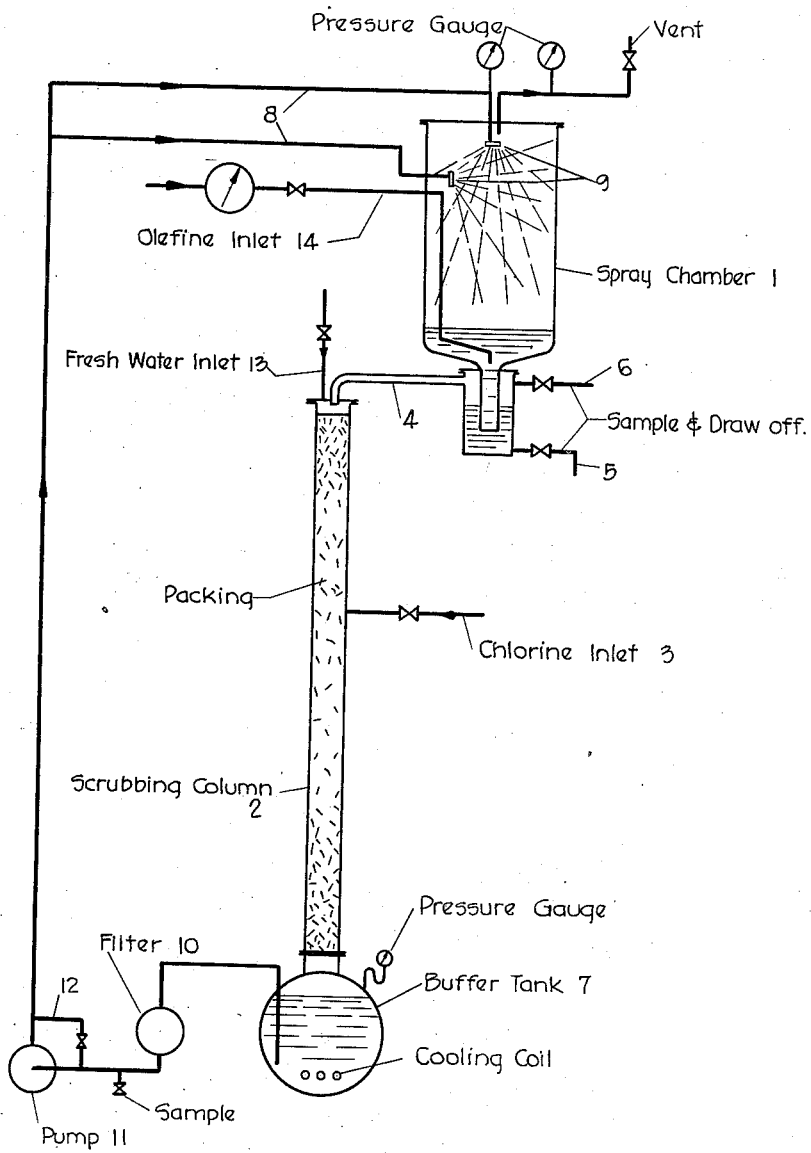

2,007,168

UNITED STATES PATENT OFFICE 2,007,168

PROCESS AND PRODUCT RELATING TO HALOHYDRINS

Carl T. Kautter, Berkeley, Calif., assignor to Shell Development Company, San Francisco, Calif., a corporation of Delaware Application February 27, 1933, Serial No. 658,757

21 Claims. (Cl. 260—157)

This invention relates to the manufacture of halohydrins and to certain of the products obtained thereby and more particularly is concerned with the preparation of chlorohydrins from hypochlorous acid or its components chlorine and water and unsaturated organic compounds wherein the aqueous solution of hypochlorous acid is introduced in a finely divided state into an atmosphere of the unsaturated body. Another feature relates to the production of chlorohydrins from tertiary-base olefines, i. e. unsaturated organic compounds of the formula $C_nH_{2n}$ which contain a tertiary carbon atom.

Normally gaseous or readily volatile unsaturated compounds are preferably employed, such as olefines as ethylene, propylene, butylene ($\alpha$, $\beta$ or $\gamma$), amylene (secondary or tertiary), members of the acetylene series as acetylene, propine, butine, pentine, diolefines as allene, butadiene, isoprene, alcohols as cinnamyl alcohol, aldehydes and ketones as acrolein, coumarin and ketenes, halides as vinyl chloride, allyl chloride, isobutenyl chloride, acetylene dichloride, amines as allyl amine and the like. The main purpose is to utilize an unsaturated organic compound which can be maintained in a vaporous state at a temperature and pressure at which the generated or free hypohalogenous acid does not decompose.

Instead of employing the pure compounds severally or in combination, one may resort to mixtures thereof with relatively unreactive substances. For example, mixtures of olefines and paraffines may be resorted to. These may be obtained by the pyrogenesis or cracking of mineral oils such as petroleum oil, shale oil, by the destructive distillation of various kinds of brown coal, by the cracking of natural carbonaceous material as petroleum products, tars, pitches, asphalts and the like.

In utilizing cracked petroleum products, I find it desirable to fractionate the same into fractions predominantly containing hydrocarbons containing the same number of carbon atoms to the molecule such as a propane-propylene cut, a butane-butene cut (which contains isobutane, normal butane, butene-1, butene-2, isobutylene and possibly some diisobutylene, a pentane-amylene cut similar to the butane-butene fraction and the like. By this means one is able to obtain relatively pure products from hydrocarbon mixtures obtained from petroleum products. If desired, one can first remove iso-olefines (tertiary) from such fractions or original mixtures and treat them independently. Separation may be effected by fractionation and/or condensation, selective extraction or the like. This permits the recovery of substantially pure halohydrins and permits greater ease of control of the reaction. Very steady running conditions can be established; in circulating systems, the temperature of the circulating solution can easily be kept within the desired limits.

Where relatively unreactive materials, such as the paraffine hydrocarbons, accompany the unsaturated organic compound or compounds to be treated, the inert material, upon liquefaction or condensation, may serve as suitable extractant for the halohydrins since the former are substantially immiscible with water and generally miscible with the halohydrins. The oily solution of halohydrin which results can then be easily separated from the aqueous phase and the former subjected to distillation at a temperature and pressure at which the solvent and solute are practically completely separated. In the case of mixtures of olefines and paraffines, including suitable fractions such as a butane-butene cut and the like, undergoing treatment, the paraffine hydrocarbons will be distilled prior to the vaporization of the halohydrin content. On removal of the paraffin hydrocarbon from its solution with chlorhydrin and water by distillation, the chlorhydrin may be left in a substantially anhydrous condition. The water present in the solution will be distilled therefrom with the paraffin hydrocarbon, since the additive vapor pressures of the hydrocarbon and water will be greater than atmospheric pressure at temperatures below the atmospheric boiling temperature of water. Mixtures whose paraffine content distill off below 100° C. are eminently satisfactory.

Where normally gaseous mixtures are employed under conditions whereat the inert material is not liquefied, it forms part of the atmosphere of the zone of reaction and from time to time is vented, otherwise the reaction zone would finally have an atmosphere composed of an inert gas or gases.

Where water, chlorine and olefine are employed to form chlorohydrin, the relationship between these components can be expressed by the following reactions.

(1) $Cl_2 + H_2O \rightleftarrows HOCl + HCl$

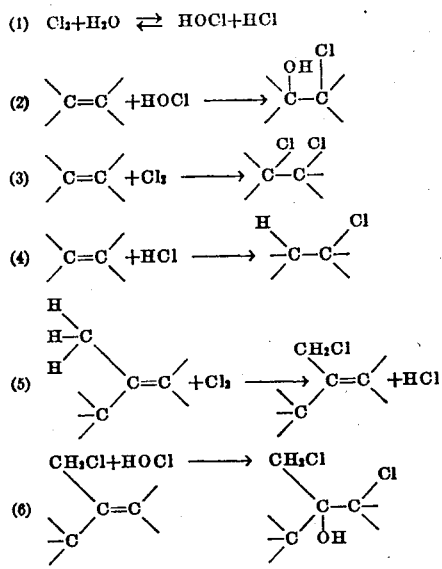

The reactions describe a case of mobile equilibrium wherein reaction (2) occurs with greater velocity than reaction (3) or any of the others provided certain conditions are observed which will be described hereinafter.

When the concentration of chlorhydrin in water has reached about 1N., the absorption of olefine and chlorine in the aqueous solution of hypochlorous acid becomes markedly slower. Higher concentrations are reached only at the expense of a good deal of olefine, since with the increase of concentration in chlorhydrin proportionately more and more of the products of reactions (3), (4), (5) and (6), especially of (3), are produced.

Prior investigators operated under the theory that it was necessary to depress the influence of hydrochloric acid which is formed in an equivalent amount with hypochlorous acid in order to avoid side reactions and principally the formation of dichlorides. To attain this end, various salts were added to the reactants which not only did not effect their purpose but, by their presence, enhanced the yield of by-products and especially that of dichlorides. For example, alkaline-earth metal chlorides in 2N. concentrations are about twice as effective as 2N.HCl in inducing the formation of dichlorides and alkali-metal chlorides are even relatively worse.

Neutralization of the hydrochloric acid is not necessary unless it be desirable to avoid the corrosive action of the acid upon the distillation vessel. The neutralization of hydrochloric acid is of little effect as regards the concentration of chlorhydrin attainable. Further, it seems as if the rate of combination of unsaturated body and HOCl is somewhat slower than when the hydrochloric acid is left unneutralized.

If, therefore, free hydrochloric acid is permitted to remain in the system, a faster rate of chlorhydrin formation is possible. However, due to the deleterious effect of the conjunctive influences of chlorhydrin and hydrochloric acid, it is desirable to maintain a control on their relative concentrations in the aqueous system so as to obviate dichloride formation and other side reactions.

By operating with an aqueous solution wherein the product of the chlorhydrin concentration and that of the hydrochloric acid is not permitted to exceed about 0.7, expressed in terms of N. solutions, I can practically avoid the formation of dichlorides and the like provided no free chlorine is present in the system in the gaseous phase. Since it is desirable to operate a process so as to obtain the highest practical concentration of chlorhydrin in order to keep recovery and concentration costs low, the practical operating maximum concentration of chlorhydrin in water in a circulating system would be about a 0.85 N. solution of chlorohydrin while that maximum of hydrochloric acid would, under that condition, comprise about a 0.85 N. solution. It can readily be seen wherein this factor could be varied within lower concentrations to obtain good results. Of course, if the concentrations are kept too low and under the maximum value described, recovery costs of chlorhydrin increase. A practical range is one wherein the product of concentrations of chlorhydrin and HCl lies between about 0.4 and about 0.7. Once the predetermined concentration of chlorhydrin in the circulating system is established and maintained, the concentrations of hydrochloric acid and chlorhydrin can be adjusted to suit the conditions by intermittently or continuously withdrawing a portion of the solution containing chlorhydrin and hydrochloric acid from the system and adding water and chlorine to the system in lieu thereof.

For purposes of convenience, I will employ the term "olefine" in the specification to exemplify the unsaturated organic compounds which are embraced by my invention. It is to be understood, however, that the compounds mentioned earlier as well as their homologues and analogues are also suitable.

It is essential that contact of olefine with chlorine in the gas phase be avoided as this will lead to immediate dichloride formation. Accordingly, I resort to a solution of chlorine in water whereby a homogeneous liquid phase is present. Whether chlorine, as such, is introduced into a body of water or whether an aqueous solution of hypochlorous acid is produced electrolytically or by metathesis, etc., does not matter so long as the aqueous solvent containing the solute is maintained as a single liquid phase. A mobile equilibrium will be established in this phase and is represented by the reaction

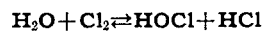

Consequently, olefine, which is subsequently introduced therein, can react only with the chlorine in solution and not with gaseous chlorine. As the rate of reactivity of olefine with hypochlorous acid is much greater than that with olefine and chlorine in solution, substantially only chlorohydrin will be formed.

Now if an excess of olefine is employed, the formation of addition products (dichlorides) and the like is further obviated. However, I have noticed that the chlorhydrin formation proceeds much faster and smoother, without formation of by-products if an absorption surface as finely divided as possible is presented to the olefine. Accordingly, I take advantage of the phenomena which influence the rate of chlorhydrin formation by proceeding substantially as follows.

I establish and maintain a body of water which also contains chlorine, hypochlorous acid and hydrochloric acid in equilibrium. To this, I add, batchwise, intermittently or continuously, the unsaturated organic body. The reaction takes place in a reaction unit from which the air has been displaced by an atmosphere of the unsaturated reagent. The unsaturated reagent (liquid or gaseous) is introduced, under pressure, into a spray, film, jet, droplets or other finely divided form of the aqueous solution of hypochlorous acid.

The unsaturated reagent is preferably as finely divided as possible and there may exist one or several jetting or atomizing devices in the reaction unit for the reagent and the solution. So long as unattacked unsaturated reagent remains in the sphere of reaction, the reaction merely goes to the formation of chlorhydrins, and the unsaturated reagent exercises a protective action shielding the product from further attack.

The absorption efficiency is helped by the presence of a dispersing agent in either or both fluid reactants which decreases surface tension. Suitable agents well-known to the art as wetting-out agents, dispersing agents, protective colloids and the like may be used. As examples, the sulfonic acids, the fatty acids, preferably the higher ones, amino acids, glue, etc. are suitable.

The degree of hydrolysis of chlorin depends very much on the efficiency with which the formed hypochlorous acid is removed from the solution by the unsaturated organic body. If the process is being conducted in an intermittent or continuous manner, water is from time to time added to a circulating stream of hypochlorous acid solution while chlorohydrin, water and hydrochloric acid is being removed from time to time to maintain the operating concentration of HOCl and HCl in the circulating system.

The presence of some chlorohydrin in the solution at the beginning of the operation seems to increase the speed of absorption of the unsaturated reagent. Accordingly, it is desirable to first build up to the proper concentration of HOCl and HCl before drawing off chlorohydrin, HCl and H₂O.

In the accompanying illustration I have shown, more or less diagrammatically, a generalized type of apparatus which may be used in many of the reactions described herein. In this showing Reference character 1 indicates a spray chamber of a suitable capacity which may be fitted with one or more atomizers for the aqueous solution of hypochlorous acid and hydrochloric acid. It may also be provided with one or more means of introducing the olefine or unsaturated organic body. The unsaturated fluid body may be directly contacted with the sprayed aqueous solution and/or, if in the gaseous state, bubbled through a body of aqueous solution contained in the spray chamber. The pressure in the chamber may be atmospheric, superatmospheric or one below atmospheric depending on specific operating conditions and the economies of the procedure adopted.

The chamber 1 is in communication with a suitable scrubbing tower 2 of any conventional type which may contain packing, perforated plates, and the like and which is provided with means 3 of introducing halogen such as chlorine into the column. The communicating conduit 4 between chamber 1 and tower 2 is so constructed as to permit steady flow of the circulating stream from the chamber to the tower and is equipped with draw-off means 5 and 6. Draw-off means 5 is adapted for the removal of water-insoluble products, such as dichlorides, which may form during the course of the reaction. Draw-off means 6 is effective for draining off halohydrin, hydrochloric acid and water from the system. If a solvent for halohydrin has been employed or a paraffine hydrocarbon utilized in conjunction with an olefine, the solvent or paraffine hydrocarbon will be removed through means 6 if the halohydrin mixture is lighter than water; otherwise it will be removed through means 5.

A vessel 7 of moderate capacity which may serve both as a buffer tank and a cooler for controlling the temperature of the solution communicates with the lower end of the tower 2. It may be considered as an unobstructed extension of said tower and is equipped with suitable means as cooling or heating coils for maintaining the proper temperature.

Lines 8, communicating with vessel 7 and spray chamber 1, are of proper dimensions and number whereby, at the prevailing temperature, pressure and velocity rates, the halogen is hydrolyzed before entering the spray chamber. Thus, any contact of gaseous or vaporized unsaturated organic body with gaseous halogen is completely avoided. Lines 8 are equipped with spraying, atomizing or jetting devices 9 so that the resulting acid solution may be introduced in a finely divided state into the chamber. The atomizing of the solution in the spray chamber provides such an effectiveness of absorption of the hypohalogenous acid by the unsaturated organic body that the solution when leaving the chamber is practically free of halogen.

A filter 10 may be interposed between vessel 7 and a pump 11 for the purpose of removing grit, to prevent injury to the pumping system and clogging of the atomizers. The pump 11 is preferably provided with a by-pass 12 for controlling the output.

Fresh water may be introduced into the system at 13 although it can easily be seen where it can be introduced in part before the halogen inlet and in part after said inlet or may even be introduced in lines 8 after the pumping mechanism or in the spray chamber itself.

Conventional valve-systems, pressure gages, and draw-off cocks may be installed wherever deemed necessary.

The operating procedure is generally as follows:

The spray chamber 1 is filled with the gaseous or vaporized unsaturated organic compound with or without attendant inert material so as to exclude all the air. The buffer tank 7 is filled with fresh water and the temperature is maintained at or below 25° C. preferably from about 5 to 20° C. The pump 11 is started and adjusted to such output as provides a suitable spray in the atomizing chamber 1, the pressure on the nozzles varying from 5–30 lbs. (gage). The water is now circulating from the buffer tank 7, through the filter 10, the pump 11, the spray chamber 1, and returning down the scrubbing tower 2 to the buffer tank 7, in this manner contacting the unsaturated material in the spray chamber.

Halogen is now introduced continuously into the scrubbing column at any convenient point. The purpose of feeding the halogen into the column is to obtain the full benefit of the scrubbing action of the water. However, the exact point of introduction of halogen is not of primary importance as long as it is completely hydrolyzed before entering the spray chamber.

The unsaturated organic compound is now introduced continuously into the spray chamber, at the ratio of about 1 mol. per one mol. of dissolved halogen.

The following advantages flow from my process. Effective absorption of the unsaturated compound is achieved by bringing the solution containing hypohalogenous acid and hydrochloric acid into an extremely fine divided form. In this manner, a large excess of gas or vapors of the unsaturated compound or compounds can be maintained in the reaction chamber at all times. This excess is entirely independent of the amount of solution in operation.

Any direct contact of gaseous reagent and halogen which does always occur with stirring equipments and which is undesirable due to the formation of dichlorides is completely avoided.

The hypohalogenous acid is preferably continuously generated outside the reaction chamber. A certain amount of time elapses between the introduction of the halogen and the discharge of the hydrolyzed solution into the reaction zone. This is favorable for a greater degree of hydrolysis in a technical process.

The halogen input, and thereby the capacity of the apparatus, is determined by the absorption efficiency of the atomizing chamber. This input may be increased to a point where free halogen just begins to be noticeable in the atomizing chamber.

The following are some of the experiments carried out in a system as described above. They are to be regarded as illustrative only.

*Example (1)*

| | |
|---|---|
| Charge of water in system | 6000 cc. |
| Running time | 6 hours |
| Chlorine introduced | 4.25 mols. |
| Ethylene introduced | 4.25 mols. |
| Average temperature of solution | 11° C. |
| Average rate of circulation | 3.0 liters/minute |
| Average pressure on nozzles | 21 lbs. |
| Theoretical ethylene chlorohydrin yield | 4.25 mols. |
| Actual yield | 3.75 mols. |

This corresponds to a yield of 88% on both chlorine and ethylene.

The capacity of the apparatus was then $$\frac{3.75}{6\times 6}=0.104 \text{ mols./hour per liter of solution.}$$

The final concentration of chlorohydrin in the solution was kept at 5.3% or 0.66 N. The concentration of hydrochloric acid was maintained at 0.66 N.

From there on the apparatus was run continuously by adding fresh water to the column and draining at the base of the chamber a solution containing 5.3% chlorohydrin, 2.4% hydrochloric acid and water.

*Example (2). β-Butylene*

| | |
|---|---|
| Charge of water into system | 8300 cc. |
| Running time | 7 hours |
| Chlorine introduced | 7.4 mols. |
| β-Butylene introduced | 7.3 mols. |
| Average temperature of solution | 15° C. |
| Average pressure on nozzles | 28 lbs. |
| Average rate of circulation | 2 liters/min. |
| Theoretical chlorohydrin yield | 7.4 mols. |
| Actual yield chlorohydrin | 5.8 mols. |

This corresponds to a yield of
78.3%—chlorine basis.
79.4%—β-butylene basis.

The capacity of the apparatus was then:

$$\frac{5.8}{7\times 8.3}=0.10 \text{ mols./hour per liter solution.}$$

The final concentration of chlorohydrin in the solution was kept at 7.5% or 0.69 N. The concentration of HCl was: 3.0%=0.82 N.

*Example (3). Isobutylene*

| | |
|---|---|
| Charge of water into system | 12000 cc. |
| Running time | 8 hours |
| Chlorine introduced | 9.7 mols. |
| Isobutylene introduced | 9.9 mols. |
| Average temperature of solution | 15° C. |
| Average pressure on nozzles | 28 lbs. |
| Average rate of circulation | 2.2 liters/min. |
| Theoretical isobutylene chlorohydrin yield | 9.7 mols. |
| Actual yield (chlorohydrin) | 7.67 mols. |

This corresponds to a yield of
79%—chlorine basis.
77.5%—isobutylene basis.

The capacity of the apparatus was then:

$$\frac{7.67}{12\times 8}=0.10 \text{ mols. per liter solution per hour.}$$

The final concentration of chlorohydrin in the solution was kept at 8.5%=0.78 N. The concentration of HCl was 3.1%=0.85 N.

*Example (4). Mixture of isobutylene and n-butane*

The gas used was of the following composition:

| | |
|---|---|
| Isobutylene | 57.8% |
| Total olefines | 63.5% |
| n-Butane | 36.5% |
| Charge of water into system | 5700 cm.³ |
| Running time | 5 hours |
| Chlorine introduced | 4.1 mols. |
| Gas introduced | 8.2 mols. |
| Olefine content of gas | 5.2 mols. |
| Average temperature of solution | 18° C. |
| Average pressure on nozzles | 28 lbs. |
| Average rate of circulation | 2.2 liters/min. |
| Theoretical isobutylene-chlorhydrin-yields | 4.1 mols |
| Actual yield (chlorhydrin) | 3.16 mols. |

This corresponds to a yield of
77.1%—chlorine basis.
63.2%—olefine basis.

The capacity of the apparatus was then:

$$\frac{3.16}{5\times 5.7}=0.11 \text{ mols. per liter solution per hour.}$$

The final concentration of chlorhydrin in the solution was kept at 5.8%=0.54 normal. The concentration of HCl was 2.81%=0.77 normal (normality product: 0.415). In this case (olefine impure with 36.5% inert material) a second spray chamber will increase the yield (olefine basis).

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. The process of making chlorohydrins which comprises establishing and maintaining an atmosphere of an unsaturated organic compound in a suitable reaction space and atomizing an aqueous solution of free hypochlorous acid and hydrochloric acid into such chamber so as to react with the unsaturated organic body.

2. The process of making chlorohydrins which comprises subjecting an excess of an unsaturated organic compound in a finely divided state to the action of an atomized aqueous solution of free hypochlorous acid and hydrochloric acid whereby chlorhydrin material is obtained.

3. The process of making chlorohydrins which comprises admixing an excess of unsaturated organic compound in a finely divided state with an aqueous solution of hypochlorous acid and hydrochloric acid, the product of concentration of chlorhydrin and hydrochloric acid, expressed in terms of N. solutions, being less than 0.7.

4. The process of making chlorohydrins which comprises directing a stream of gaseous olefine under pressure against a downwardly flowing finely divided stream of hypochlorous acid and hydrochloric acid dissolved in water, the product of concentration of chlorhydrin and hydrochloric acid, expressed in terms of N. solutions, being between about 0.4 and 0.7.

5. The process of making chlorohydrins which comprises bubbling a current of olefine through a liquid body which contains chlorohydrin, directing a finely divided solution of hypochlorous acid and hydrochloric acid dissolved in water against said liquid body and at all times maintaining an olefine atmosphere in the reaction zone.

6. The process of making chlorohydrins which comprises contacting a gaseous olefine with an atomized liquid stream of hypochlorous acid and hydrochloric acid.

7. The process of making chlorohydrins which comprises adding sufficient chlorine to a circulating stream of water so as to maintain a homogeneous liquid system containing at least chlorine, water, hypochlorous acid and hydrochloric acid, introducing said stream in an atomized state into an atmosphere consisting essentially of olefine and maintaining said atmosphere while continuously removing chlorohydrin from the system.

8. The process of making chlorohydrins which comprises reacting a hydrocarbon fraction consisting predominately of butane and butene with hypochlorous acid at a temperature and pressure at which butane is in the liquid state, removing liquid butane charged with chlorohydrin from the sphere of reaction and recovering chlorohydrin from the solvent vehicle.

9. In the process of making chlorohydrins, the step of dehydrating the crude chlorohydrin after it has been separated from the aqueous reaction mixture proper which comprises distilling the aqueous solution in the presence of a paraffine hydrocarbon at a temperature below 100° C.

10. In the process of making chlorohydrins, the step of dehydrating the crude aqueous mixture of an individual chlorohydrin after it has been separated from the aqueous reaction mixture proper which comprises distilling the same in the presence of a paraffine hydrocarbon having the same number of carbon atoms to the molecule as the alkylene group of the chlorohydrin.

11. The process of making chlorohydrins which comprises introducing a finely divided aqueous solution of chlorine into a gaseous body of excess olefine, continuing the reaction until the concentration of the resulting chlorhydrin reaches a predetermined value less than a 1N. solution and thereupon circulating the liquid stream in a cyclic system while continuously adding water, chlorine and olefine thereto at a rate at which chlorohydrin and formed hydrochloric acid are removed from the system.

12. The process of making chlorohydrins which comprises introducing a finely divided aqueous solution of chlorine into an established and maintained gaseous body of excess olefine, continuing the reaction until the concentration of the resulting chlorohydrin reaches a predetermined value less than a 1N. solution and thereupon circulating the liquid stream in a cyclic system while continuously adding water, chlorine and olefine thereto at a rate at which chlorohydrin and formed hydrochloric acid are removed from the system.

13. The process of making chlorohydrins which comprises introducing a finely divided aqueous solution of chlorine into an established and maintained gaseous body of excess olefine, continuing the reaction until the concentration of chlorohydrin reaches a predetermined value less than a 1N. solution and thereupon circulating the liquid stream in a cyclic system while continuously adding water, chlorine and olefine thereto at a rate at which chlorohydrin and formed hydrochloric acid are removed from the system, the olefine being added in a finely divided state to the dissolved chlorine.

14. The process of making chlorohydrins which comprises introducing a finely divided aqueous solution of chlorine into an established and maintained gaseous body of excess olefine, continuing the reaction until the concentration of chlorohydrin reaches a predetermined value less than a 1N. solution and thereupon circulating the liquid stream in a cyclic system while continuously adding water, chlorine and olefine thereto at a rate at which chlorohydrin and formed hydrochloric acid are removed from the system, the olefine being added in the finely divided state to the dissolved chlorine while the latter is being atomized into the atmosphere of excess olefine.

15. The process of making chlorohydrins which comprises reacting an atomized aqueous solution of hypochlorous acid and hydrochloric acid with an excess of gaseous olefine in the absence of a metal compound.

16. The process of making chlorohydrins which comprises reacting a tertiary olefine in a finely divided state with a finely divided aqueous stream of hypochlorous acid and hydrochloric acid.

17. The process of making chlorohydrins which comprises reacting tertiary butylene in the gaseous state with a finely divided aqueous stream of hypochlorous acid and hydrochloric acid.

18. The process of making chlorohydrins which comprises establishing and maintaining an atmosphere of substantially isobutylene in a reaction chamber, and introducing therein a finely divided aqueous stream of hypochlorous acid and hydrochloric acid.

19. The process of making chlorohydrins which comprises reacting a hydrocarbon fraction consisting predominately of olefine and paraffin hydrocarbons containing the same number of carbon atoms to the molecule with hypochlorous acid at a temperature and pressure at which the paraffin hydrocarbon is in the liquid state, removing the paraffin hydrocarbon containing chlorohydrin from the sphere of reaction and dehydrating and removing chlorohydrin by distilling the mixture so as to drive off the paraffin hydrocarbon and the water.

20. In a process of making chlorohydrin, the step of dehydrating a crude, aqueous solution of chlorohydrin after it has been separated from the aqueous reaction mixture proper comprising distilling the same in the presence of a paraffin hydrocarbon boiling below 100° C.

21. The process of making chlorhydrins which comprises subjecting an excess of an unsaturated organic compound in a finely divided state to the action of a finely divided aqueous solution of free hypochlorous acid and hydrochloric acid whereby chlorhydrin material is obtained.

CARL T. KAUTTER.